(12) United States Patent
Dziadosz et al.

(10) Patent No.: US 6,241,267 B1
(45) Date of Patent: Jun. 5, 2001

(54) CONTROL ARM FOR USE IN VEHICLE SUSPENSION SYSTEM

(75) Inventors: Lawrence M. Dziadosz, Milfor; Ralf Pionke, Farmington Hills, both of MI (US)

(73) Assignee: R. J. Tower Corporation, Grand Rapids, MI (US)

( * ) Notice: Subject to any disclaimer, the term of this patent is extended or adjusted under 35 U.S.C. 154(b) by 0 days.

(21) Appl. No.: 09/455,854

(22) Filed: Dec. 7, 1999

(51) Int. Cl.$^7$ ....................................................... B06G 3/10
(52) U.S. Cl. .............................. 280/124.134; 280/124.135
(58) Field of Search .................... 280/124.134, 124.128, 280/124.131, 124.129, 124.132, 124.133, 124.135, 124.15, 124.137, 124.138, 124.14

(56) References Cited

U.S. PATENT DOCUMENTS

| | | |
|---|---|---|
| 1,380,659 | 6/1921 | Layman . |
| 1,903,064 | 10/1930 | Onstott . |
| 3,193,302 | 7/1965 | Hill ....................................... 280/124 |
| 5,280,945 | 1/1994 | Delbeke . |
| 5,310,210 | 5/1994 | Delbeke et al. . |
| 5,310,211 | 5/1994 | Delbeke . |
| 5,338,056 | 8/1994 | Vrana et al. . |
| 5,498,018 | * 3/1996 | Wahl et al. . |
| 5,607,177 | * 3/1997 | Kato . |
| 5,662,348 | 9/1997 | Kusama et al. . |
| 5,695,213 | * 12/1997 | Nakamura et al. . |
| 5,820,768 | 11/1998 | Kaneko et al. . |
| 6,074,016 | * 6/2000 | Blondelet et al. . |

FOREIGN PATENT DOCUMENTS

| | | |
|---|---|---|
| D. 29 52 176 A1 | 7/1981 | (DE) . |
| D. 39 21 468 C1 | 5/1990 | (DE) . |
| 2 088 793 | 5/1981 | (GB) . |
| 58188712 | 11/1983 | (JP) . |

* cited by examiner

*Primary Examiner*—Eric Culbreth
(74) *Attorney, Agent, or Firm*—Oppenheimer Wolff & Donnelly LLP; Craig J. Lervick

(57) ABSTRACT

A control arm used as a suspension link within a vehicle suspension system has two similar members. Each member has a substantially W shaped cross section and circular endplates. The endplates are coupled together with bushings that include a compressible member. During normal loading, this bushing arrangement keeps the two members spaced apart. This allows each member to bend and flex when subjected to longitudinal forces. As transverse loading occurs, the two members are caused to move together, and eventually abut one another. This abutment greatly increases the overall strength of the control arm, allowing it to withstand severe transverse forces without buckling.

7 Claims, 4 Drawing Sheets

CONTROL ARM FOR USE IN VEHICLE SUSPENSION SYSTEM

BACKGROUND OF THE INVENTION

1. Field of the Invention

This invention relates generally to linking members coupling a frame or structural member of a vehicle to a wheel housing. More specifically the present invention relates to a control arm used in an independent suspension system that provides sufficient flexibility when needed, yet provides adequate and increasing support during loading which otherwise may cause the control arm to buckle.

2. Description of the Related Art

In most vehicles today, the structural foundation is either a traditional frame, or unibody member. Most other components are then coupled or affixed to this foundation. Where unibody construction is used, subframe elements are often added to provide additional support and attachment points. For example, the vehicle's wheels are coupled to the structural foundation by a moveable support. The wheels can then be attached to this moveable support using a wheel drum as an intermediary. Many other components are similarly attached using appropriate attachment structures. Alternatively, this coupling can be connected directly to elements of the frame.

During movement or operation, various forces will be imparted on the vehicle. All of these forces will eventually be transferred to the subframe through all related components. In the case of the vehicle's suspension system, forces will be directed through the moveable support member, causing many different stresses and loads. These forces are most easily described with respect to the well understood orientation of the vehicle, where the frame or body is in a substantially horizontal position, with a centerline (or central axis) extending between the front and rear of the vehicle.

The most common forces a vehicle encounters is simply vertical displacement of the wheel housing. Such movement is induced by the vehicle encountering various bumps or obstacles in the road. These bumps or obstacles are expected and must be dealt with by the vehicle's suspension system. Since it is undesirable to impart this motion to the passenger cabin, various shock absorbers and springs are incorporated to deal with these forces. The link between the subframe and the wheel drum housing freely pivots in this direction thus causing substantially all vertical forces to be handled by the springs and shock absorbers.

Longitudinal forces are also imparted on the wheel housing as the vehicle travels. This results in various forces being presented to all components of the suspension. Lastly, tension loading occurs as force is applied to the wheel by pulling it away from the vehicle center line and transverse loading occurs in an opposite direction, pushing the wheel towards the center line of the vehicle.

In the vehicle's suspension system, all of the components must appropriately carry each of these loads. This load handling requirement is in addition to the basic function of attaching the wheels and allowing the vehicle to operate. Thus, each component of the system must be specifically engineered for its particular purpose, and must cooperate with all other components.

In a rear independent suspension system, the assembly coupling the wheel drum housing to the frame or rear cradle consists of a number of control arms. The control arms are required to accommodate all of the above-referenced forces encountered by the associated wheel. Vertical forces are primarily dealt with by springs and/or shock absorbers which cooperate with one or more of the control arms. As previously suggested, the control arms are hinged to allow free movement in the vertical direction. Thus, all vertical forces are transferred to the springs or shocks.

The wheel, as described, is also subjected to various longitudinal, transverse, and tensile forces. Various combinations of the forces imparted on the wheel will be applied to the control arms. The net result is that the control arms themselves will be subjected to longitudinal, transverse and tensile forces resulting from forces being applied to the wheel. Whatever force or combinations of forces is applied to the wheel (and wheel drum housing), the resultant force that is applied to each of the control arms must be appropriately handled by that component. As such, each control arm and its elastomer bushings are configured to handle the forces applied to it, dependent upon the direction of the force. It is to be understood that it is the resultant force that is applied to the control arm, in the longitudinal, tensile or transverse direction with respect to the part itself, that is being discussed with respect to the various responses that the control arm will achieve.

Tension loading forces (pulling away from the frame) are typically minimal and need not be considered separately, as longitudinal and transverse forces are the major considerations for the control arms. During longitudinal loading (which generates torque on the control arm), it is desirable to have soft torsional modes in the rear most control arm, which is also referred to as a suspension link. In other words, rigid resistance under longitudinal loading is undesirable, as this would cause these forces to be felt by the passengers. Therefore, if the suspension link is compliant and able to twist in response to the torque generated, the forces are absorbed and not passed on. Conversely, transverse loads (compression loads) (forcing the control arm towards the frame) can be rather extreme and could cause the suspension link to buckle. This makes it difficult to design a suspension link which is adequately compliant in the longitudinal direction and sufficiently strong in the transverse direction.

Various suspension systems have been provided to address the longitudinal forces imparted by a vehicle in motion. For example, U.S. Pat. No. 5,662,348 issued to Kusama et al. on Mar. 20, 1996, discloses a one-piece suspension arm wherein the portion of the suspension arm subject to the most longitudinal stress has been bent at each end to provide a more rigid frame. Kusama et al. utilizes less material, hence making the suspension arm lighter while imparting sufficient resistance to longitudinal forces. However, this design does not necessarily provide for the soft torsional bending which would be desirable in a suspension link. Furthermore, Kusama et al. fails to address the relatively high transverse forces which are also imparted.

As such, there exists a need to provide a control arm having soft torsional modes while providing adequate support during high transverse loading.

SUMMARY OF THE INVENTION

The present invention provides a two-piece control arm for use as a suspension link, particularly in a rear independent suspension system. The present control arm is also applicable to various other control arm positions in both a front and rear independent suspension system. In a preferred embodiment, each piece of the control arm has a substantially W-shaped cross-section over a majority of its length. Other cross-sectional shapes can be provided to accomplish the same results. The ends of each piece of the control arm are configured to mate with one another in a male/female relationship. A compressible bushing and tubular insert are provided at each of these end points so as to form a developed gap between edges of each of the two pieces by keeping them spaced at a fixed distance. A tubular end section of the second piece is slid over the tubular end section of the first piece. Both are then expanded, causing them to lock together. The frictional engagement between the two end sections causes the two pieces to lock together and remain spaced apart. As higher levels of transverse loading are applied to the suspension link, during vehicle operation the two pieces begin to flex and move together. When the loading ceases, the resiliency of metal returns the two pieces to their original position and redevelops the gap.

During use, the two-piece control arm is capable of responding differently depending upon the type of stresses that are placed on it. Specifically, the part has relatively "strong" characteristics in response to certain stresses while having softer characteristics in response to other stresses.

During longitudinal loading (generating torque on the control arm) of the two-piece control arm, each piece of the control arm remains separate and twists or moves independently, responsive to the loading stresses. During transverse loading of the two-piece control arm, the pieces of the control arm are caused to compress towards one another and if the transverse loading is sufficient, they will contact one another. Such contact may occur at each extreme edge as well as a middle planar portion. As the two pieces of the control arm come together, the control arm as a whole becomes substantially stronger and is able to withstand very high transverse loads.

This two-piece control arm is advantageous in that it can handle loading in all three directions with the appropriate level of support, yet during the most severe transverse loading, provides more support than a one-piece stamping of more than twice the thickness. This allows the control arm to be manufactured using less material, and hence achieving significant cost reductions. Furthermore, the stock material used can be significantly thinner than previously used, allowing less expensive stock material to be purchased and utilized. The use of this thinner material also eases manufacturing burdens in that less effort is required to stamp the pieces out of the stock material. Yet despite all of these reductions, a stronger and more adaptable control arm is produced.

By way of example, traditional one-piece suspension link control arms are formed from tubular stock. The tubular stock is typically 2 to 2½ times more expensive than sheets or blanks of the same material. In the present process, a single press stroke forms both pieces of the control arm. Conversely, the tubular stock must be bent and shaped. Then various attachment mechanisms must be coupled to it. This is not trivial in that bending and shaping tubular material is difficult, time consuming and expensive. In the end, when the price of material and the cost of manufacturing are taken into account, a traditional control arm will cost about three times more than a two-piece control arm and will not work as effectively.

It is an object of the present invention to provide a two-piece control arm that becomes stronger as increasing transverse forces are applied to it.

It is another object of the present invention to provide a two-piece control arm that has soft torsional modes when longitudinal forces are applied to it.

It is yet another object of the present invention to provide a two piece control arm where the two pieces act independently until sufficient force is applied in a transverse direction to cause the two pieces to contact one another.

It is still yet another object of the present invention to provide a suspension link in a rear suspension system utilizing a two-piece control arm which increases in strength as force is applied to the control arm in a transverse direction and exhibits soft torsional modes as force is applied to the control arm in a longitudinal direction.

DETAILED DESCRIPTION OF PREFERRED EMBODIMENTS

Figure 1:
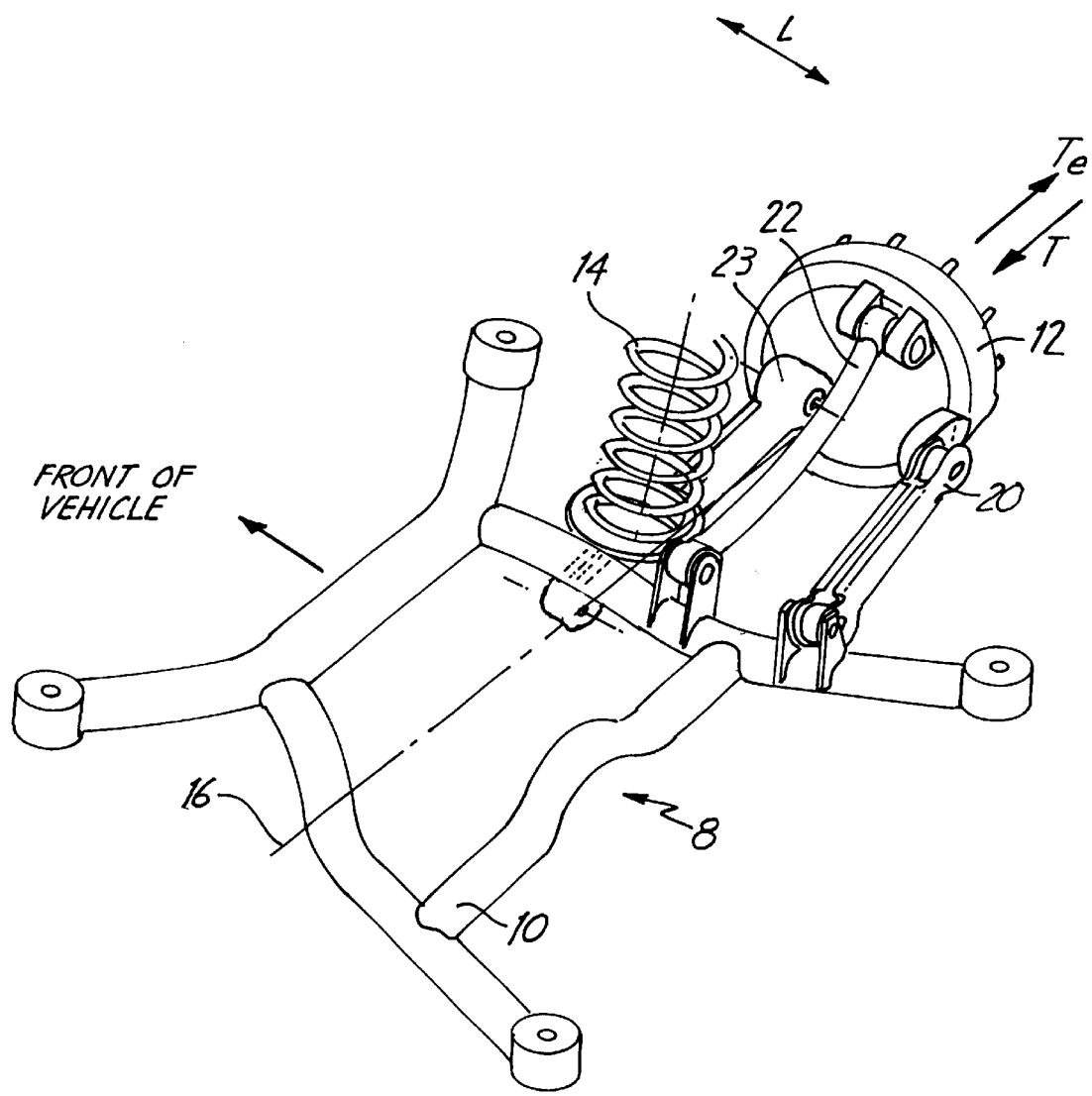
FIG. 1 is a perspective view of a rear cradle having a wheel drum (or disk) housing attached thereto by a plurality of control arms.

Referring to FIG. 1, the two-piece control arm 20 of the present invention is shown in the context of a rear independent suspension system 8. The rear cradle 10 forms a portion of the frame of the vehicle. Wheel drum housing 12 supports the braking assembly and wheels for the vehicle. Wheel drum housing 12 is attached to rear cradle 10 and is aligned with the rear axle line 16. As shown, three control arms connect the wheel drum housing 12 to the rear cradle 10; rear control arm 20 (suspension link 20), upper control arm 22, and front control arm 23. A spring 14 and shock absorber (not shown) are coupled to front control arm 23 to absorb vertical displacement of the wheel drum housing 12 whereas the suspension link 20 and upper control arm 22 are able to freely pivot in this direction. The front of the vehicle is indicated as shown. Suspension link 20 must be designed to handle the three disparate forces indicated. Movement of wheel drum housing 12 (with respect to the rear cradle 10) along the center line of the vehicle results in longitudinal forces as designated by arrow "L." Movement of wheel drum housing 12 away from the center of the vehicle results in tension loading as indicated by arrow "Te." Finally, movement of wheel drum housing 12 towards the center of the vehicle, results in transverse forces as indicated by arrow "T." Generally, the longitudinal, transverse and tensile forces will be applied to wheel drum housing 12 in various combinations due to a plethora of external factors. As these forces are applied, wheel drum housing 12 is caused to react by moving with respect to rear cradle 10. This movement, in turn, imparts forces onto all components, including the suspension link 20. As such, suspension link 20 is independently subjected to longitudinal, transverse and tensile forces, caused by the movement of wheel drum housing 12 with respect to rear cradle 10. Whatever force is applied to wheel drum housing 12 and whatever direction it may be applied in, it is the resultant force that is applied to the suspension link 20 that is of interest here.

As shown, suspension link 20 is the only control arm utilizing the present two-piece construction. Suspension link 20 benefits the most from this construction because it should have soft torsional modes when subjected to longitudinal loading yet be very stiff and structurally sound when under transverse loading. In addition, upper control arm 22 could also utilize the two-piece construction (with the appropriate bend), though it is simply shown as a tubular member. It would be advantageous to use the two-piece configuration for the upper control arm 22 because it is significantly less expensive. Finally, many suspension systems utilize more than three control arms, and as such, additional two-piece control arms can be used. Generally, front control arm 23 will remain a very rigid and very thick one piece member. This is because front control arm 23 needs to be very stiff and strong to support the shocks or springs utilized. As such, it is made much heftier than the remaining control arms.

Figure 2:
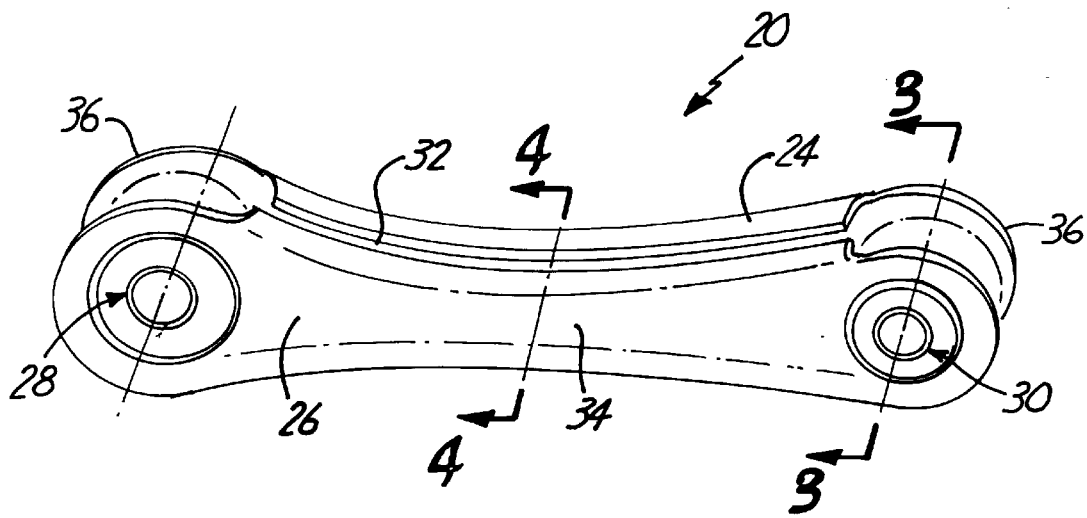
FIG. 2 is a side perspective view of the two-piece control arm of the present invention.

Referring to FIG. 2, two-piece control arm 20 is shown to have an elongated first control arm member 24 and a substantially similar elongated second control arm member 26. Each member 24 and 26 terminates in circular end sections 36. Members 24 and 26 are joined together at first bushing 28 and second bushing 30.

Figure 3:
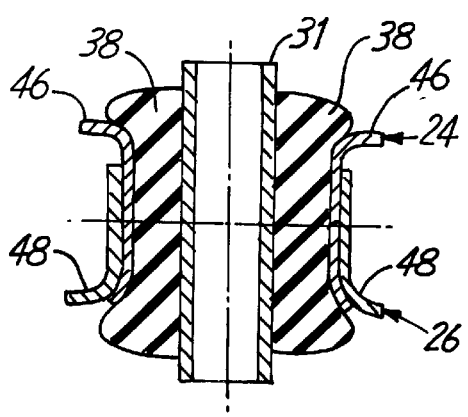
FIG. 3 is a sectional view of a bushing within the control arm taken about line 3—3.

Referring to FIG. 3, second bushing 30 is shown in a sectional view taken about line 3—3. Inner cylinder 31 is inserted through first member 24 and second member 26. A compressible member 38 surrounds inner cylinder 31 and is made from a suitable material such as rubber. The tubular inner shell 46 of first member 24 surrounds compressible portion 38. The tubular outer shell 48 of second member 26 then surrounds tubular inner shell 46. Tubular inner shell 46 is flared outwards, causing inner shell 46 and outer shell 48 to tightly abut one another and effectively lock together. Referring again to FIG. 2, members 24 and 26 are spaced apart from one another, leaving developed gap 32. Transverse forces applied to control arm 20 will cause members 24 and 26 to buckle slightly, allowing them to move towards one another and abut, thus reducing or eliminating developed gap 32.

Figure 4:
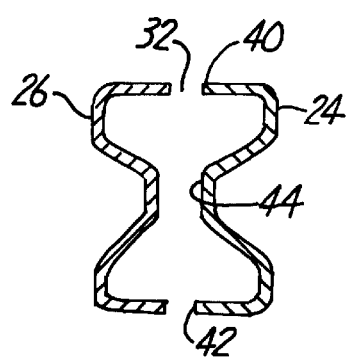
FIG. 4 is a sectional view of the two-piece control arm taken about line 4—4.

FIG. 4 is a sectional view taken about line 4—4 in FIG. 2 and illustrates how each of the first member 24 and second member 26 has a substantially W-shaped cross-section, in the illustrated preferred embodiment. Other cross-sectional configurations can be selected to achieve the same result. Each member 24, 26 terminates in a first edge 40 and a second edge 42 and has disposed medially therebetween a center web 44. The bushings 28 and 30 keep the first member 24 and second member 26 spaced substantially as shown in FIG. 4 so that the respective first edges 40, second edges 42, and center webs 44 of each member 24, 26 do not normally contact one another.

Figure 5:
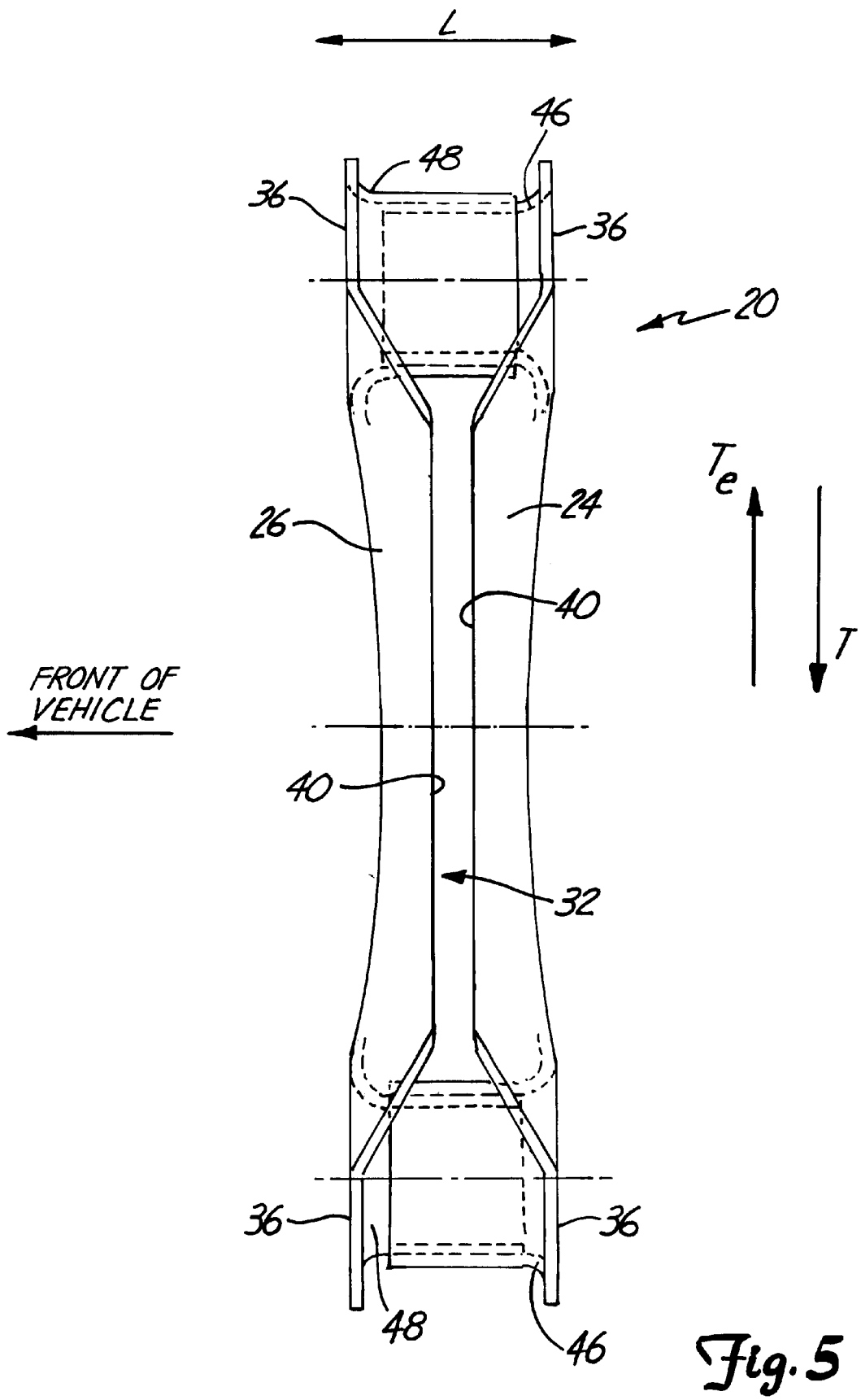
FIG. 5 is a top perspective view of the two-piece control arm of the present invention.

FIG. 5 is a top perspective view of control arm 20. As can be seen, first member 24 has a tubular inner shell 46 extending from each end portion 36. Correspondingly, the second member 26 has a tubular outer shell 48 disposed at each end thereof within circular portion 36. Tubular inner shell 46 is sized to fit very tightly within tubular outer shell 48. Once so arranged, inner shell 46 is flared to lock the inner shell 46 and outer shell 48 together in this position.

Figure 6:
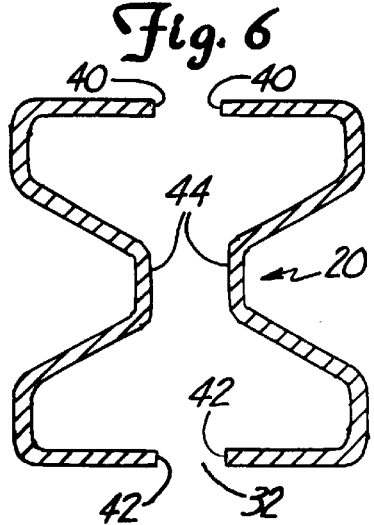
FIG. 6 is a sectional view of the two-piece control arm taken about line 4—4 during normal loading stresses.

FIG. 6 is a sectional view of control arm 20 when no forces are being applied. As such, first member 24 is separated from second member 26 with developed gap 32 being at its maximum. As illustrated, first edges 40, second edges 42 and contact areas 44 do not contact their counterparts between first member 24 and second member 26, respectively.

Figure 7:
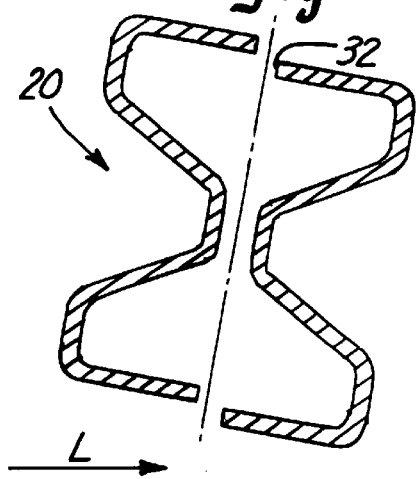
FIG. 7 is a sectional view of a control arm taken around line 4—4 during clockwise longitudinal stresses.
Figure 8:
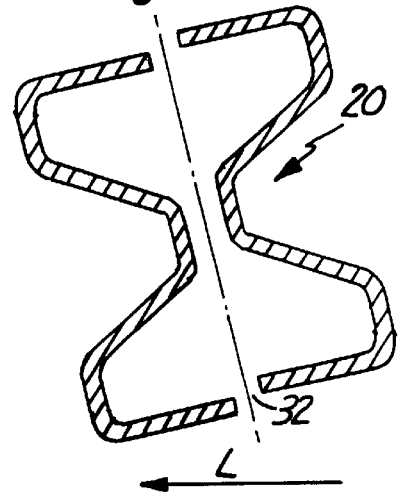
FIG. 8 is a sectional view of a control arm taken about line 4—4 during counterclockwise longitudinal stresses.

FIG. 7 illustrates control arm 20 when longitudinal forces are being applied which create torque on the control arm 20 in a clockwise direction. As can be seen, first member 24 and second member 26 are able to rotate independently of one another thereby absorbing the longitudinal forces. Since first member 24 remains separate from second member 26, soft torsional modes are imparted, thereby allowing sufficient flexibility within the suspension system. FIG. 8 simply illustrates longitudinal forces herein applied to control arm 20 in a counter-clockwise direction.

Figure 9:
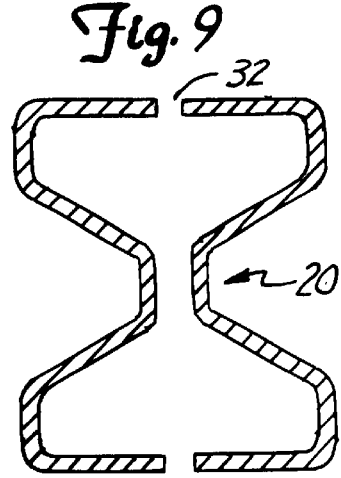
FIG. 9 is a sectional view of a control arm taken about line 4—4 during increased transverse loading.
Figure 10:
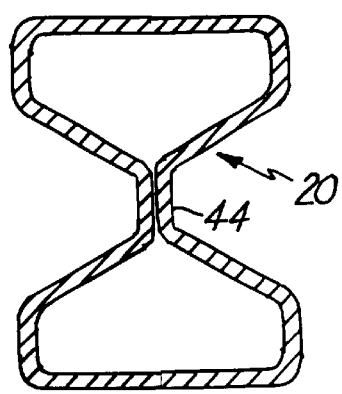
FIG. 10 is a sectional view of a control arm taken about line 4—4 during high transverse loading.

As shown in FIG. 9, control arm 20 is now being subjected to transverse forces. Initially, compressible member 38 absorbs these forces. As these forces increase, first member 24 is caused to move towards second member 26 as the transverse forces are sufficient to cause members 24 and 26 to begin to buckle, or more accurately flex. Respective first edges 40, center webs 44, and second edges 42 of both first member 24 and second member 26 move towards one another. When sufficient transverse loads are being applied, as shown in FIG. 10, first edges 40, second edges 42 and center webs 44 are caused to abut one another. This, in effect, causes first member 24 and second member 26 to form a unitary control arm 20 wherein the developed strength of control arm 20 as shown in FIG. 10 is substantially stronger than either first member 24 or second member 26 would be alone and prevents the control arm 22 from collapsing. Once the transverse loading ceases, the resiliency of members 24 and 26 cause the control arm 20 to return to its original configuration.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A control arm for use in a suspension system, comprising:

a first member having a first end and a second end with an elongated portion therebetween; and a second member having a first end and a second end with an elongated portion therebetween, wherein the first end of the first member is coupleable to the first end of the second member and the second end of the first member is coupleable to the second end of the second member so that a gap is developed and maintained between the first member and the second member, wherein the first member is able to abut the second member, and eliminate the developed gap, only while a force sufficient to cause the first member and the second member to flex towards one another is applied to the control arm in a transverse direction and the first member and the second member move away from one another due to the resiliency of the first and second members when the force is removed.

2. The control arm of claim 1 including first and second couplings able to couple the ends of the first and second members, wherein the first and second couplings are bushings.

3. The control arm of claim 2 wherein the bushings comprise:

a first inner tubular shell on the first end of the first member which surrounds a first compressible member;

a second inner tubular shell on the second end of the first member which surrounds a second compressible member;

a first outer tubular shell on the first end of the second member which surrounds the first inner tubular shell; and a second outer tubular shell on the second end of the second member which surrounds the second inner tubular shell.

4. The control arm of claim 1 wherein the first member and the second member each have a W shaped cross section through the elongated portion.

5. The control arm of claim 4 wherein the W shaped cross section forms a first edge, a second edge and a central web on each of the first and second members.

6. The control arm of claim 5 wherein the first edge, the second edge and the central web of the first member contact the first edge, the second edge, and the central web of the second member, respectively, when sufficient force is applied in a transverse direction so that the gap is eliminated.

7. The control arm of claim 1 wherein the first member and the second member are able to temporarily twist with respect to one another when longitudinal loading occurs.

* * * * *